United States Patent [19]
Christopher et al.

[11] 3,780,808
[45] Dec. 25, 1973

[54] SECONDARY RECOVERY METHOD

[75] Inventors: Charles A. Christopher, Houston; Joseph C. Allen, Bellaire, both of Tex.; Jack H. Kolaian, Wappingers Falls, N.Y.

[73] Assignee: Texaco Inc., New York, N.Y.

[22] Filed: Mar. 29, 1972

[21] Appl. No.: 239,388

[52] U.S. Cl............ 166/275, 166/274, 252/8.55 D
[51] Int. Cl............................................ E21b 43/22
[58] Field of Search............... 166/275, 274, 273; 252/8.55 D

[56] References Cited
UNITED STATES PATENTS

| | | | |
|---|---|---|---|
| 3,377,275 | 4/1968 | Michalski et al. | 252/8.55 D |
| 2,920,041 | 1/1960 | Meadors | 166/275 |
| 3,208,515 | 9/1965 | Meadors | 166/274 |
| 3,326,287 | 6/1967 | Corrin | 166/274 X |
| 3,368,620 | 2/1968 | Harvey | 166/274 |
| 3,515,216 | 6/1970 | Gies | 166/292 X |

Primary Examiner—Stephen J. Novosad
Attorney—Thomas H. Whaley et al.

[57] ABSTRACT

A method of secondary recovery of hydrocarbons which involves injecting a fluid into an injection well and producing hydrocarbons from a production well involves the use of a novel thickened injection fluid. The fluid comprises an intimate mixture of water, hydrocarbon solvent and colloidal silica. The fluid is miscible with hydrocarbons in the reservoir and aqueous fluids and provides a decreased mobility ratio to enhance sweep efficiency.

10 Claims, No Drawings

SECONDARY RECOVERY METHOD

BACKGROUND OF THE INVENTION

In a hydrocarbon reservoir which has been produced to the point that it is devoid of natural energy; it may be desirable to institute secondary recovery methods to recover the large amount of hydrocarbon still left in the reservoir. Most secondary recovery operations are generally carried out by injecting an extraneous fluid into the reservoir which will then migrate to an output well pushing the hydrocarbon ahead of it. The hydrocarbon is recovered at the output well. Even in secondary recovery operations about one-half of the hydrocarbon is left behind in the reservoir. The inefficiency of the displacement process is due to two retentive forces, viscosity and capillarity. The retentive force of viscosity may be removed by heating the formation to a point where the viscosity of the reservoir hydrocarbon becomes equal to or less than the viscosity of the displacing fluid or by increasing the viscosity of the displacing fluid. However, if the displacing fluid is not miscible with hydrocarbon, the retentive force of capillarity will not be removed. To remove the retentive force of capilarity it is necessary to use as a displacing fluid a material which is miscible with the hydrocarbon. If the displacing fluid is miscible with the reservoir hydrocarbon the interface between the hydrocarbon and displacing fluid will be removed and, therefore, so will the retentive force of capillarity.

Displacement efficiency is a term referring to the amount of hydrocarbon removed from the portion of the reservoir actually swept by the displacing fluid. Displacement efficiency may be low due to high surface tension at the interface between the displacing fluid and the hydrocarbon in the reservoir. If this surface tension can be removed the capillary forces will be reduced to zero and the hydrocarbon may be completely displaced from the portions of the reservoir contacted by the displacement fluid.

Sweep efficiency is a term referring to the percentage of the reservoir actually contacted or swept by the displacing fluid regardless of the amount of hydrocarbon removed from the swept portion or displacement efficiency referred to above. A major cause of poor sweep efficiency is associated with the fact that the injected displacement fluid generally has a lower viscosity than the hydrocarbon to be displaced.

If the visocity of the fluid displacing the reservoir hydrocarbon to the production wells is lower than the reservoir hydrocarbon, premature breakthrough of the driving fluid into the production wells will occur. The displacing fluid actually fingers through the reservoir hydrocarbon and proceeds to the production well before an adequate portion of the reservoir has been swept. The effects of viscosity on sweep efficiency may be descriped in terms of the mobility ratio. The mobility ratio is defined by the following equation:

$$M = (K_2/u_2)/(K_1/u_1)$$

where $M$ = mobility ratio
$u_2, u_1$ = viscosity of displacing fluid and displaced fluid (hydrocarbon), respectively:
$K_2, K_1$ = relative permeability of the formation with respect to the displacing fluid and the displaced fluid respectively.

At high mobility ratios the phenomenon commonly known as fingering occurs and the displacing fluid does not display a flat front to the reservoir hydrocarbon, but instead, rushes ahead at various points in finger like protrusions which may prematurely break through to the production wells. The hydrocarbon in areas not touched by the "fingers" of displacing fluid is usually left unrecovered in pockets of the reservoir. Since most displacing fluids are more mobile than the displaced fluid, the hydrocarbon, the mobility ratio will usually be quite high, and a poor areal sweep efficiency will occur because of fingering.

As stated in the *Reservoir Engineering Manual* by Frank W. Cole, Gulf Publishing Co., 1969, at page 230:

"The capillary forces holding the oil in the reservoir rocks can be eliminated if an injection fluid is used which is miscible with the reservoir oil.

Although these miscible fluids will displace 100 percent of the oil which they contact, recovery is actually substantially less because of the low viscosity and low density of the injected fluid. The low viscosity causes channeling and bypassing, and the low density promotes gravity segregation and consequent over-running of the oil. Because of these two factors, this method works best in low viscosity, high API gravity oil reservoirs."

Polymeric compounds which increase the viscosity of the displacing fluid so as to lower the mobility ratio and increase the sweep efficiency of the displacing fluid have been developed and used in recent years. For example, U.S. Pat. No. 3,039,529 discloses the use of polyacrylamide solutions to increase the viscosity of the displacing fluid. Also, U.S. Pat. No. 3,581,824 discloses the use of polysaccharides for the same purpose. Although these polymers are useful for increasing the viscosity of the displacing fluid they are expensive. Also, the displacing fluid containing these polymers tends to decrease in viscosity as it travels through the reservoir away from the injection well bore due to absorption of the polymer from solution and to mechanical degradation of the polymer.

The method of this invention provides an injection fluid which is miscible with the reservoir hydrocarbon while having a high enough viscosity so that the mobility ratio will be low enough to prevent fingering.

The method of our invention provides an injection or displacing fluid which will not decrease in viscosity as it moves away from the injection well bore.

The method of our invention provides an injection fluid which is miscible with both water and hydrocarbon.

The term reservoir hydrocarbon and the like in this disclosure refer generally to oil of various viscosities found in subterranean reservoirs.

SUMMARY OF THE INVENTION

The invention is a method for recovering hydrocarbon from subterranean hydrocarbon reservoirs which is penetrated by at least one injection well and one production well wherein a thickened fluid is injected into an injection well and hydrocarbon is produced from a production well. The fluid comprises an intimate mixture of water, a hydrocarbon solvent miscible with reservoir hydrocarbon and colloidal silica. The invention is also the novel injection fluid described above.

DESCRIPTION OF THE PREFERRED EMBODIMENTS

THE FLUID

The injection fluid useful in the process of our invention comprises an intimate mixture of water, a hydrocarbon miscible with the reservoir hydrocarbon and colloidal silica. A surfactant and/or a polar multifunction compound may be added to adjust the viscosity of the fluid.

The water may be fresh or mineral ladened as, for example, salt water obtained from a subterranean formation in the vicinity of oil bearing zones. The water selected should be compatible with the formation it is to be injected into so that harmful swelling, for instance, will not occur.

The cooliodal silica useful in our invention is different from precipitated silica or silica gel. The colloidal silica useful in our invention is a fumed silica which is made up of chain-like formations sintered together. These chains are branched and have enormous external surface areas of from about 50 to about 400 meters$^2$/gram. Each segment in the chain has many hydroxyl (OH) groups attached to silicon atoms at the surface. When the segments come into proximity to each other, these hydroxy groups will bond to each other by hydrogen bonding to form a three dimensional network.

The colloidal silica acceptable for use in the method of this invention should have a particle size ranging from about 7 to 15 millimicrons (mu). In this size range the colloidal silica will pass through even reservoirs with very small pore size. For example, a reservoir having a very low permeability of say 0.016 millidarcies (md) has a correspondingly small pore size of 25 to 100 mu. Thus, the colloidal silica suitable for use in the process of this invention will pass through even the smallest pores encountered in hydrocarbon reservoirs and will maintain a constant viscosity in the displacing fluid.

Colloidal silicas are readily available from manufacturers. One source is the Cabot Corporation of Boston, Massachusetts under the trade name CAB-O-SIL. Colloidal silica is also available from other commercial sources and the reference to one source is not intended to limit the scope of our invention.

When the silica particles are dispersed in a liquid medium, the network structure formed by the silica particles restricts the movement of the molecules of the liquid medium. This results in an increase in the viscosity of the liquid.

The thickening efficiency of the silica is directly related to the polarity of the liquid to be thickened. The use of selected additives (surfactants and/or multifunctional compounds) can increase the thickening efficiency of the silica. In the case of the hydrocarbon solvent mentioned above, these additives react with the interface between the silica and the solvent and increase the degree to which the silica particles form the three dimensional network. This allows less silica to be used to achieve equivalent thickening of the solvent. Usually less then 0.5 percent of the additive based on the weight of total liquid to be thickened will achieve marked increases in viscosity.

For liquids of high polarity such as water, aldehydes, ketones, etc., cationic and nonionic surfactants, e.g., oleoyl trimethylene diamine and nonyl polyethoxy ethanols can cause dramatic increases in viscosity. Low polarity or non-polar liquids, such as hydrocarbons, are thickened by the use of anionic surfactants such as sodium linear allylate sulfonate and multifunctional compounds such as ethylene glycol.

Depending on the system, dramatic changes in viscosity can occur by using two additives such as nonionic surfactant, and a cationic type.

The hydrocarbon component of the injection fluid of our invention must be a solvent for the reservoir hydrocarbon, that is, it must be miscible with the reservoir hydrocarbon. Examples of suitable hydrocarbons are aromatics such as benzene and toluene and aliphatics such as LPG, propane, butane, isobutane, pentane, isopentane, and hexane. Also, any mixture of suitable hydrocarbon solvents which when mixed retain their miscibility characteristics with the reservoir hydrocarbon are acceptable.

The multifunctional compounds mentioned above fall into the general class of compounds with a plurality of groups available for hydrogen bonding. Examples of such compounds are amines, ethylene glycol, glycerine, and propylene glycol.

The surfactant which may be used in the injection fluid of our invention may broadly be any compound which reduces surface tension of the water, thus reducing the surface tension between the water and the reservoir oil. Soap may be used, for instance, the sodium salts of high molecular weight alkyl sulfates or sulfonates. Also very useful are nonionic surfactants which are usually a reaction product of a hydrophobic and a hydrophilic material, such as the reaction product between alkyl phenols and ethylene oxide.

The method of preparation of the injection fluid of our invention involves blending. The technique described below has been found to form a satisfactory colloidal fluid of a specific viscosity. Other techniques may possibly be discovered which will also form a satisfactory fluid. The method used is given to aid in carrying out our invention and is not intended to limit the scope of our invention.

An example of preparation of a typical fluid of our invention is as follows:

1. Measure out 200 milliliter (ml) n-hexane into a waring blender.
2. With blender at low speed, add 4 grams colloidal silica.
3. Blend 1 minute at 16,000 revolutions per minute (rpm) - a soft gel forms.
4. Add with blending 3 ml of a nonionic surfactant, 3 ml glycerine, and 20 ml water - a firm gel forms. The gel so formed, if protected from evaporation of the water and hexane is stable and could be transported to the well site as is.
5. At least 1000 ml more hexane and 210 ml water are added to the firm gel to reduce its viscosity to that to be used for injection.

A material made, as outlined above, has remained a stable liquid of about 160 centipoise viscosity for a year.

The fluid of our invention should be adjusted in viscosity so that the mobility ratio is not less than about 0.1 nor more than about 10. At the higher mobility ratios fingering will have more of a tendency to occur and at the lower mobility ratios the fluid will become progressively more viscous and difficult to pump. It is especially preferred that the mobility ratio range from about 0.9 to about 3.

Of course, once the desired mobility ratio is known, the necessary viscosity of the fluid may easily be calculated. The viscosity of the fluid described in our invention may be tailored to fit the needs of the user by variations of ingredients. Due to the number of ingredients, a detailed explanation of methods of varying viscosity is impractical to give. However, it will be evident to one skilled in the art what effect each ingredient has on the viscosity so that an infinite number of fluids may be made which will fall within the scope of our invention.

USE OF THE FLUID

A firm gel of the hydrocarbon solvent to be used will be prepared containing the hydrocarbon, water, surfactant, polar multifunctional additive and colloidal silica. If a less firm gel is desired the surfactant and multifunctional additives may be reduced or eliminated. The techniques of preparation as described above may be used. This gel may then be reduced to the proper viscosity with water, which thickens the fluid to a point due to hydrogen bonding, above which additional water thins it. The amounts of water to be used will depend on the amounts of the other ingredients and the ingredients themselves. The gel may also be reduced in viscosity by adding additional hydrocarbon solvent.

The fluid of this invention is then injected into the reservoir in order to displace the oil in the reservoir to production wells. The fluid of our invention may conceivably be the only fluid injected into the formation but considering its relatively expensive character and the vast quantities which would be needed to flood an entire oil reservoir, it is preferred to use the fluid of our invention as a slug. A slug of the fluid of our invention would be injected into the reservoir followed by another fluid. The trailing fluid may be water, gas or some treated fluid.

The thickened miscible slug of our invention may be used according to standard methods of miscible slug displacement. The lower mobility of the miscible slug of our invention will remove problems of fingering and overriding encountered wth conventional miscible fluids. It is within the skill of the art to determine the proper slug size and rate of displacement to be used. As is known by those skilled in the art there is considerable controversy over the size of miscible slug which should be used. A standard text: *Mechanics of Secondary Oil Recovery*, Smith, Reinhold, New York, 1966, provides much basic information on miscible displacement.

One advantage to using the fluid of this invention is that while it is miscible with oil at the leading edge of the slug; it is also miscible with the fluid which follows it such as water. This double miscibility results in a gradual viscosity gradient at the trailing edge of the fluid slug of our invention. This viscosity gradient prevents a sharp viscosity difference and, therefore, there is little tendency for the trailing fluid to finger into the slug.

The fluid of this invention also provides an improvement over the polymer thickened fluids in shear resistance. When polymer thickened fluids are subjected to the tremendous shear forces present as they are pushed through the reservoir rock they lose viscosity, particularly in the vicinity of the well bore, and the mobility ratio rise results in possible fingering effects. However, the fluid of our invention does not lose appreciable viscosity due to shear forces.

Injection of the fluid of this invention may be in a secondary recovery operation or in a tertiary recovery operation. For example, after a conventional water flood or polymer flood or any other secondary recovery operation the fluid of this invention may be injected to remove additional hydrocarbons.

EXPERIMENTAL

A linear, unconsolidated sand pack was saturated with 69.2 ml of Brelum crude (Duval County, Texas, viscosity 38 cp). The pack contained no connate water. It was waterflooded at constant pressure drop with 2.31 pore volumes of 2 percent NaCl solution and 34.4 cc (49.7 percent) of oil were produced. The pack was then flooded with 1.5 pore volumes of 250 ppm polyacrylamide solution in 2 percent NaCl and an additional 16.1 ml of oil (23.3 percent) were produced. This was followed by 2.7 pore volumes of 2 percent NaCl which produced an additional 1.0 ml of oil (1.5 percent). Thus a total of 51.5 ml (74.5 percent) of oil had been produced. This left the pack containing 17.7 ml of oil, a saturation of 25.5 percent.

The fluid described on page 8 of the application was injected into the pack in a tapered slug. Approximately 10.8 ml (15.6 percent pore volume) was injected directly, followed by 10 ml blended into the leading edge of a slug of 250 ppm polyacrylamide in 2 percent NaCl. Approximately 25 ml (36 percent P.V.) of polyacrylamide slug was injected, blended into 2 percent NaCl which was injected last. The 2 percent NaCl slug comprised approximately one pore volume. At this point 60.5 ml (87.5 percent) of the oil had been recovered. Thus the thickened hydrocarbon slug and its drive liquids resulted in the recovery of additional 13 percent recovery from sand pack that had had extensive previous waterflooding and in fact had been polymer flooded.

It appeared that, in this pack containing only 25.5 percent oil saturation, oil was banked and removed ahead of a clean sand zone as the flood progressed.

I claim:

1. A method for recovering hydrocarbons from subterranean hydrocarbon bearing reservoirs comprising:
    a. penetrating the reservoir with at least one injection well and one production well which are in fluid communication with the reservoir and
    b. injecting into the injection well a thickened fluid comprising an intimate mixture of water, a hydrocarbon solvent miscible with the reservoir hydrocarbon, and colloidal silica and
    c. producing hydrocarbons from the production well.

2. A method as in claim 1 wherein the injected fluid is injected as a slug.

3. A method as in claim 2 wherein the injected fluid comprises an intimate mixture of water, surfactant, a hydrocarbon solvent miscible with the reservoir hydrocarbons, a polar multifunctional material, and colloidal silica.

4. A method as in claim 1 wherein the mobility ratio between the injected fluid and the reservoir hydrocarbon is from about 0.1 to about 10.

5. A method as in claim 4 wherein the mobility ratio is from about 0.9 to about 3.

6. In a method for recovering hydrocarbons from subterranean hydrocarbon bearing reservoirs wherein at least one injection well and one production well are in fluid communication with said reservoir and an injection fluid is injected into the injection well and hydrocarbons are produced from the production well the improvement which comprises:

injecting a thickened fluid comprising an intimate mixture of water, a hydrocarbon solvent miscible with the reservoir hydrocarbons and colloidal silica.

7. A method as in claim 6 wherein the fluid is injected as a slug.

8. A method as in claim 7 wherein the injected fluid comprises an intimate mixture of water, a surfactant, a hydrocarbon solvent miscible with the reservoir hydrocarbons. a polar multifunctional material and colloidal silica.

9. A method as in claim 6 wherein the mobility ratio between the injected fluid and the reservoir hydrocarbon is from about 0.1 to about 10.

10. A method as in claim 9 wherein the mobility ratio is from about 0.9 to 3.0.

* * * * *